US012259679B2

(12) United States Patent
Abe et al.

(10) Patent No.: US 12,259,679 B2
(45) Date of Patent: Mar. 25, 2025

(54) DEVELOPING CARTRIDGE INCLUDING CASING THAT HAS RECESSED PORTION AND BOSS CONNECTING TWO OPPOSING WALLS OF CASING INSIDE TONER CHAMBER, AND IMAGE FORMING APPARATUS USING THE SAME

(71) Applicant: BROTHER KOGYO KABUSHIKI KAISHA, Nagoya (JP)

(72) Inventors: Koji Abe, Okazaki (JP); Takuya Amaike, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/349,509

(22) Filed: Jul. 10, 2023

(65) Prior Publication Data

US 2024/0027950 A1 Jan. 25, 2024

(30) Foreign Application Priority Data

Jul. 25, 2022 (JP) ................................ 2022-117855

(51) Int. Cl.
*G03G 21/16* (2006.01)
*G03G 15/08* (2006.01)
*G03G 21/18* (2006.01)

(52) U.S. Cl.
CPC ..... *G03G 21/1647* (2013.01); *G03G 15/0889* (2013.01); *G03G 21/1821* (2013.01); *G03G 2215/0816* (2013.01); *G03G 2221/1684* (2013.01)

(58) Field of Classification Search
CPC ........... G03G 21/1647; G03G 15/0889; G03G 21/1821; G03G 2215/0816; G03G 2221/1684; G03G 21/18; G03G 21/1676
See application file for complete search history.

(56) References Cited

U.S. PATENT DOCUMENTS

2003/0123900 A1* 7/2003 Higeta ................. G03G 21/181 399/109
2006/0093399 A1 5/2006 Okabe et al.
2021/0173326 A1* 6/2021 Wang ................. G03G 21/1821

FOREIGN PATENT DOCUMENTS

JP 2006-154744 A 6/2006
JP 2017-116854 A 6/2017

* cited by examiner

*Primary Examiner* — Sandra Brase
(74) *Attorney, Agent, or Firm* — Merchant & Gould P.C.

(57) ABSTRACT

A developing cartridge is attachable to a drawer that is movable in a first direction relative to a main housing of an image forming apparatus. The developing cartridge includes: a casing having a toner chamber; and a developing roller positioned at one end of the casing in a second direction and rotatable about an axis extending in a third direction. The casing includes: a recessed portion recessed from an outer surface of the casing toward the developing roller; a first wall extending in the second direction; and a first boss positioned inside the toner chamber. The recessed portion is positioned at a center in the third direction of another end of the casing in the second direction. The first wall and the second wall form the toner chamber. The first boss extends from the first wall to be connected to the second wall.

24 Claims, 7 Drawing Sheets

DEVELOPING CARTRIDGE INCLUDING CASING THAT HAS RECESSED PORTION AND BOSS CONNECTING TWO OPPOSING WALLS OF CASING INSIDE TONER CHAMBER, AND IMAGE FORMING APPARATUS USING THE SAME

REFERENCE TO RELATED APPLICATIONS

This application claims priority from Japanese Patent Application No. 2022-117855 filed on Jul. 25, 2022. The entire content of the priority application is incorporated herein by reference.

BACKGROUND ART

There has been conventionally known a developing cartridge that includes a handle to enable a user to grab the same for replacement of the developing cartridge. One of such conventional developing cartridges includes a handle that protrudes upward from a housing of the developing cartridge. There has also been known another conventional developing cartridge that enables a user to hold a housing storing toner therein, rather than to grab a handle protruding upward from the housing. Specifically, in the developing cartridge, the housing has anti-slip portions each configured of a plurality of protrusions. The anti-slip portions are respectively provided at two opposing surfaces of the housing.

DESCRIPTION

However, in the above-described conventional configuration in which the user holds the housing, the user may encounter a difficulty in grabbing the housing if the housing is enlarged in size to accommodate a larger amount of toner therein, which may in turn hinder the user's exchanging task. Further, as a larger amount of toner is to be stored in the housing, the developing cartridge becomes heavier in weight. As such, the user may be required to hold the housing with a greater force and the housing may be more prone to deformation. Deformation of the housing would possibly result in leakage of the toner accommodated in the housing.

In view of the foregoing, it is an object of the present disclosure to provide a developing cartridge that can have a larger toner capacity, facilitate user's replacement task, and suppress deformation of the housing.

In order to attain the above and other object, according to one aspect, the present disclosure provides a developing cartridge attachable to a drawer of an image forming apparatus, the drawer being movable in a first direction relative to a main housing of the image forming apparatus. The developing cartridge includes a casing and a developing roller. The casing has a toner chamber configured to accommodate toner therein. The casing has one end portion and another end portion spaced apart from each other in a second direction, the one end portion of the casing being at one side in the second direction and the another end portion of the casing being at another side in the second direction. The developing roller is positioned at the one end portion of the casing in the second direction. The developing roller is rotatable about a first axis extending in a third direction. The casing includes a recessed portion, a first wall, a second wall, and a first boss. The recessed portion is recessed from an outer surface of the casing toward the developing roller. The recessed portion is positioned at a center in the third direction of the another end portion of the casing in the second direction. The first wall extends in the second direction and forms a part of the recessed portion. The second wall faces the first wall in the first direction. The second wall defines a part of the toner chamber. The first boss is positioned inside the toner chamber. The first boss extends from the first wall to be connected to the second wall.

With the above structure, the casing can be enlarged in size in the second direction to increase a toner capacity, compared to a conventional developing cartridge whose housing is provided with a handle protruding therefrom in the second direction. Further, since a user can insert his fingers in the recessed portion to hold the casing with a larger toner capacity, the user can easily exchange the developing cartridge. Further, even if the user grabs the first wall and the second wall with a greater force to hold the casing, the first boss extending from the first wall to the second wall can suppress deformation of the casing.

According to another aspect, the disclosure also provides an image forming apparatus including a main housing, the above-described developing cartridge, and a drawer to which the developing cartridge is attachable. The drawer is movable in the first direction between a first position at which the drawer is positioned inside the main housing and a second position at which the drawer is positioned outside the main housing.

With the above structure, the toner capacity of the developing cartridge can be enlarged, and replacement of the developing cartridge relative to the drawer can be facilitated while deformation of the casing of the developing cartridge can be restrained.

EMBODIMENT

Hereinafter, one embodiment of the present disclosure will be described with reference to accompanying drawings.

Figure 1:
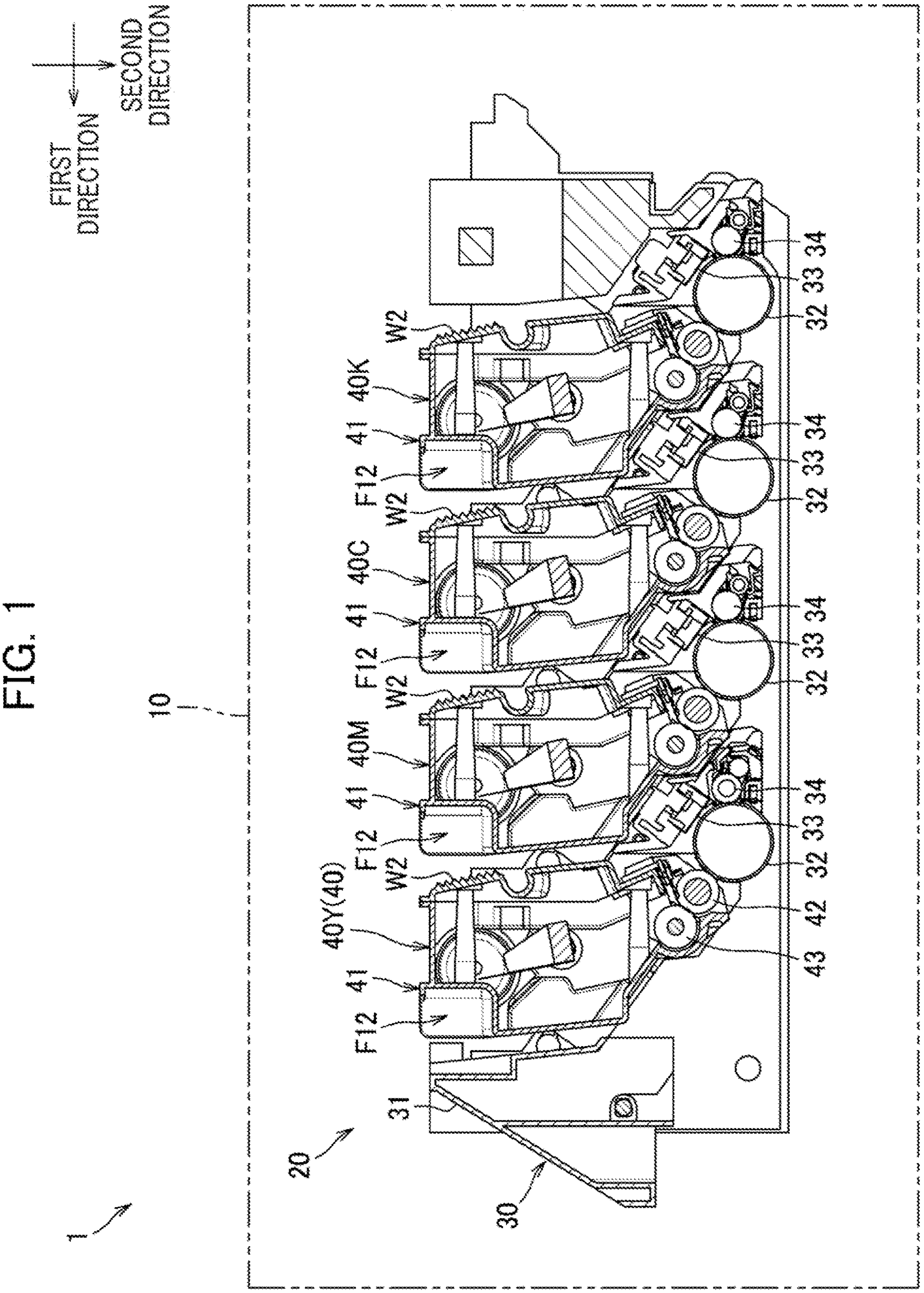
FIG. 1 is a cross-sectional view of an image forming apparatus.

As illustrated in FIG. 1, an image forming apparatus 1 includes a main housing 10 and a process unit 20. In FIG. 1, as a matter of convenience, the main housing 10 is depicted in a smaller size than an actual size thereof.

In the present embodiment, a front-rear direction with respect to the main housing 10 will be referred to as "first direction", an up-down direction orthogonal to the front-rear direction will be referred to as "second direction", and a left-right direction orthogonal to both the front-rear direction and up-down direction will be referred to as "third direction" throughout the specification. Also, in the drawings, a direction indicated by an arrow with respect to each of the first to third directions represents one side in the corresponding direction. A direction opposite the direction indicated by each arrow presents another side in the corresponding direction.

The process unit 20 includes a drawer 30 and four developing cartridges 40.

Figure 2:
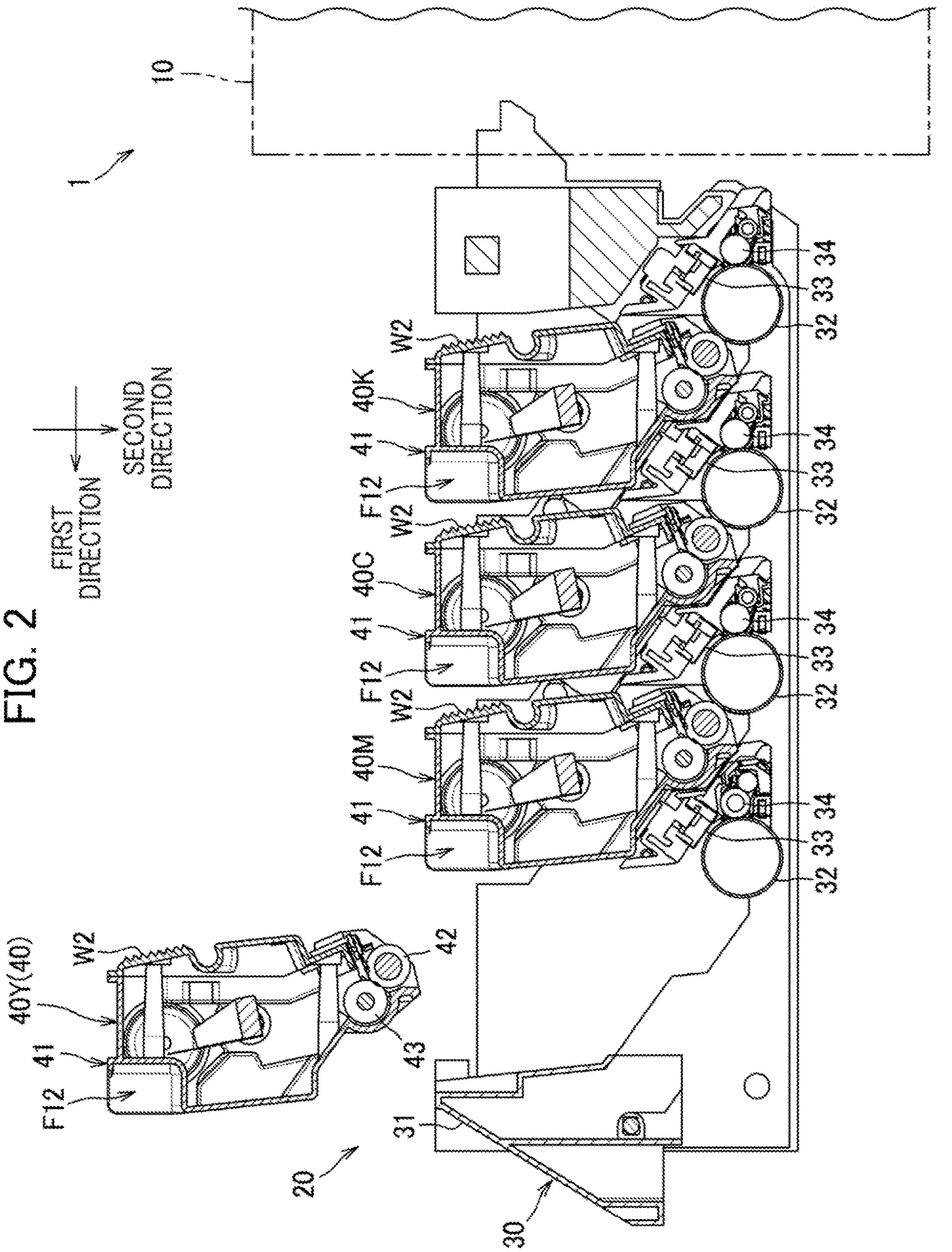
FIG. 2 is a schematic cross-sectional view illustrating a state where a drawer is pulled out from a main body of the image forming apparatus.

The drawer 30 is movable in the first direction between a first position depicted in FIG. 1 and a second position depicted in FIG. 2. When the drawer 30 is at the first position, the drawer 30 is positioned inside the main housing 10. When the drawer 30 is at the second position, the drawer 30 is pulled out from the main housing 10 to be positioned outside the main housing 10. The drawer 30 includes a drawer flame 31, four photosensitive drums 32, four chargers 33, and four cleaning rollers 34.

The four developing cartridges 40 respectively accommodate toner of mutually different colors. In this specification and accompanying drawings, Y, M, C and K (corresponding to the respective colors of yellow, magenta, cyan and black) will be appended to the reference numeral 40, as appropriate, when any of the developing cartridges 40 needs to be identified in association with the corresponding colors thereof. That is, a developing cartridge 40Y represents a developing cartridge 40 storing yellow toner therein, a developing cartridge 40M represents a developing cartridge 40 storing magenta toner therein, a developing cartridge 40C represents a developing cartridge 40 storing cyan toner therein, and a developing cartridge 40K represents a developing cartridge 40 storing black toner therein.

As illustrated in FIG. 2, the developing cartridges 40 are configured to be attached to the drawer 30 in the second direction. Incidentally, the developing cartridges 40 need not be attachable to the drawer 30 in the second direction, but may be attachable in a direction slightly inclined with respect to the second direction.

Figure 3:
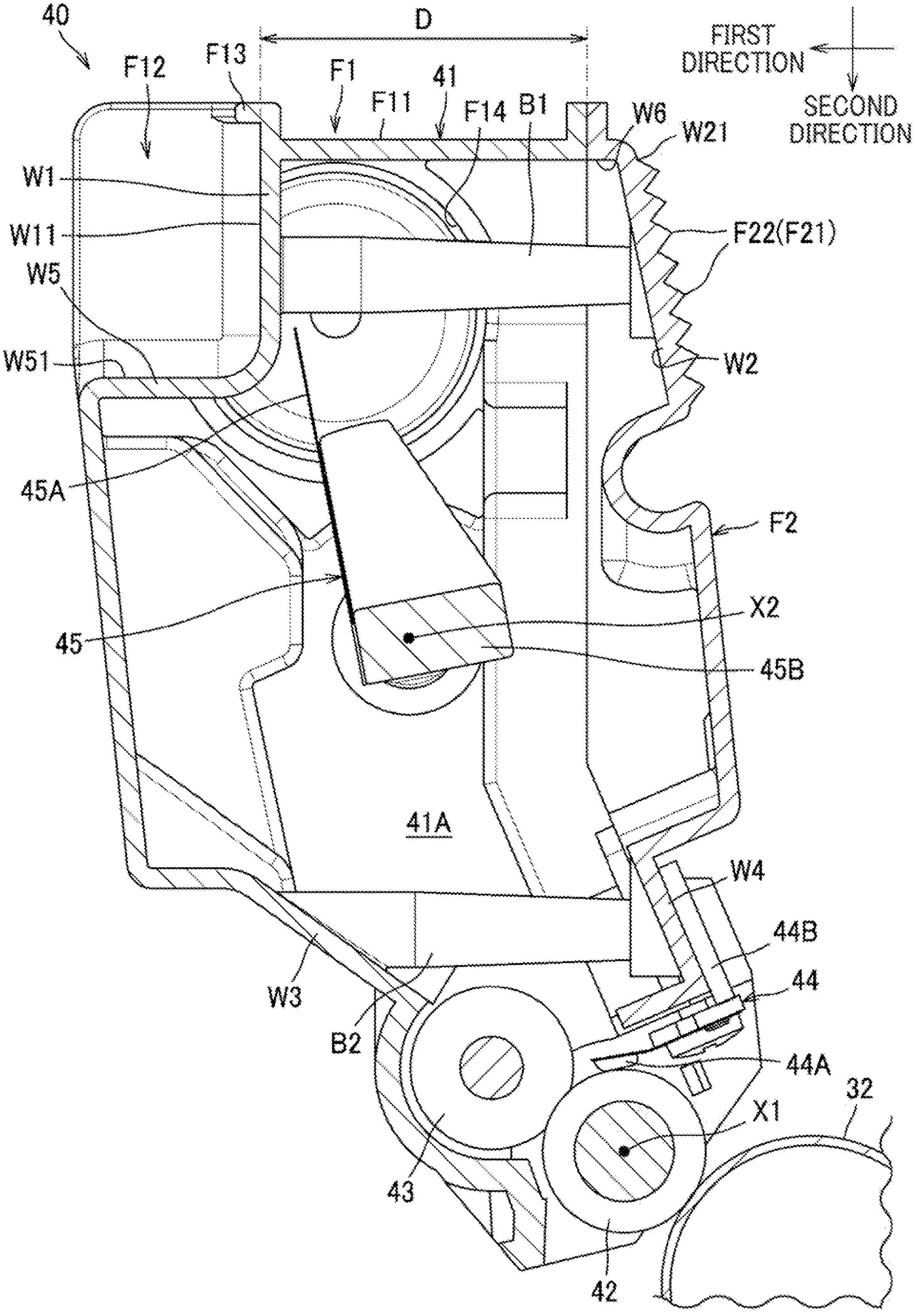
FIG. 3 is a cross-sectional view of a developing cartridge according to one embodiment of the disclosure.
Figure 4:
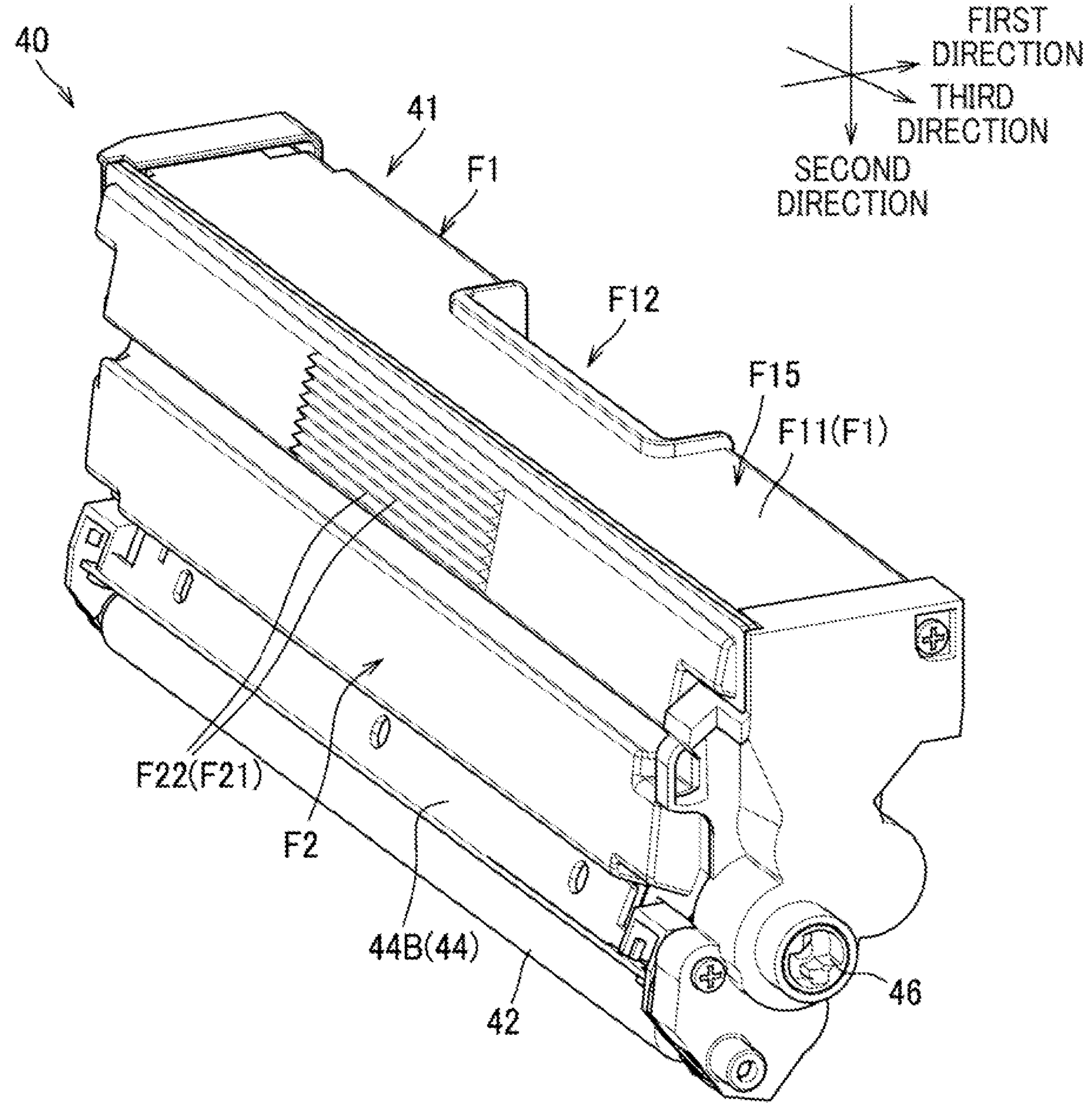
FIG. 4 is a perspective view of the developing cartridge according to the embodiment.

As illustrated in FIGS. 3 and 4, each developing cartridge 40 includes a casing 41, a developing roller 42, a supply roller 43, a thickness-regulating blade 44, an agitator 45 and a coupling 46.

The coupling 46 is configured to receive a driving force from a motor (not shown) provided in the main housing 10. The coupling 46 is configured to transmit the driving force from the motor to the developing roller 42 and the agitator 45. The coupling 46 is provided at one side surface of the casing 41 at one side in the third direction where a toner injection hole F14 (described later) is formed.

The developing roller 42 is configured to supply toner to the photosensitive drum 32. The developing roller 42 is rotatable about a first axis X1 extending in the third direction. The developing roller 42 is positioned at an end portion of the casing 41 at one side in the second direction.

The supply roller 43 is configured to supply toner to the developing roller 42. The thickness-regulating blade 44 is configured to regulate a thickness of a toner layer carried on the developing roller 42. The thickness-regulating blade 44 includes a blade 44A, and a holder 44B holding the blade 44A. The blade 44A has a distal end configured to make contact with the developing roller 42.

The agitator 45 is configured to agitate the toner accommodated in the casing 41. The agitator 45 is rotatable about a second axis X2 extending in the third direction. The agitator 45 includes a film 45A, and a holder 45B holding the film 45A.

The holder 45B is supported by the casing 41 so as to be rotatable about the second axis X2. The film 45A extends from the holder 45B toward an inner peripheral surface of the casing 41 so as to make contact with the inner peripheral surface of the casing 41.

The casing 41 has a toner chamber 41A configured to accommodate toner therein. The casing 41 includes a first frame F1, and a second frame F2.

The first frame F1 is positioned on the one side in the first direction relative to the toner chamber 41A. The second frame F2 is positioned on the other side in the first direction relative to the first frame F1. The second frame F2 and the first frame F1 together form the toner chamber 41A. The first flame F1 and the second flame F2 are positioned opposite each other with respect to the toner chamber 41A. The first frame F1 is welded to the second frame F2. Incidentally, the first frame F1 may be screw-fixed to the second frame F2.

The first frame F1 has a length in the first direction that is greater than a length in the first direction of the second frame F2. As illustrated in FIG. 4, the first frame F1 has a flat surface F11 positioned at an end of the casing 41 at another side in the second direction. The flat surface F11 extends in the third direction to span between both ends of the first frame F1 in the third direction. The flat surface F11 is a part of an outer surface F15 of the first frame F1.

The first frame F1 has a recessed portion F12 that is recessed relative to the flat surface F11. The recessed portion F12 is positioned at a center in the third direction on the end of the first frame F1 at the other side in the second direction.

The recessed portion F12 is recessed from the outer surface F15 of the first frame F1 toward the developing roller 42 and toward the second frame F2. This configuration enables a user to insert his fingers into the recessed portion F12 from the other side in the second direction as well as from the one side in the first direction.

As illustrated in FIG. 3, the recessed portion F12 is positioned to overlap with the toner chamber 41A when viewed in the first direction. The first frame F1 includes a first wall W1, a third wall W3, a fifth wall W5, two first bosses B1, two second bosses B2, and a protrusion F13.

The first wall W1 and the fifth wall W5 constitute the recessed portion F12. The first wall W1 extends in the second direction and in the third direction. The first wall W1 mainly extends from the flat surface F11 toward the one side in the second direction. The first wall W1 has a portion that slightly extends from the flat surface F11 toward the other side in the second direction.

The fifth wall W5 extends from an end of the first wall W1 at the one side in the second direction toward the one side in the first direction. In other words, the fifth wall W5 extends from the end of the first wall W1 at the one side in the second direction (a lower end of the first wall W1 in FIG. 3) to extend away from the toner chamber 41A (the second flame F2) in the first direction. The protrusion F13 protrudes toward the one side in the first direction from a portion of the first wall W1 that is spaced apart from the fifth wall W5 in the second direction. Specifically, the protrusion F13 extends toward the one side in the first direction from an end of the first wall W1 at the other side in the second direction. The protrusion F13 protrudes from the end of the first wall W1 at the other side in the second direction (upper end of the first wall W1 in FIG. 3) to extend away from the toner chamber 41A (the second flame F2) in the first direction. The protrusion F13 has a length in the first direction that is smaller than a length of the fifth wall W5 in the first direction.

The first wall W1 has a first surface W11 that defines a part of the recessed portion F12. The fifth wall W5 has a second surface W51 that defines another part of the recessed portion F12. The first surface W11 and the second surface W51 are flat surfaces. The first surface W11 extends in the second direction and in the third direction. The second surface W51 is positioned, relative to the first surface W11, on the one side in the second direction and on the one side in the first direction. The second surface W51 extends in the first direction and in the third direction.

The first surface W11 is exposed to an outside of the casing 41 in a direction orthogonal to the first wall W11. The second surface W51 is exposed to the outside of the casing 41 in a direction orthogonal to the second surface W51. In other words, the developing cartridge 40 has no portion within a projection of the first surface W11 in a direction orthogonal to the first surface W11 and away from the toner chamber 41A. Also, the developing cartridge 40 has no portion within a projection of the second surface W51 in a direction orthogonal to the second surface W51 and away from the toner chamber 41A.

The recessed portion F12 is spaced away from the second frame F2 in the first direction. The recessed portion F12 and the second frame F2 define a gap distance D therebetween in the first direction that is greater than a length (thickness) of the first wall W1 in the first direction. Specifically, the gap distance D (the distance between an end of the recessed portion F12 at the other side in the first direction and an end of the second frame F2 at the one side in the first direction) is longer than the length (thickness) of the first wall W1 in the first direction. Also, the gap distance D in the first direction is greater than a diameter of the developing roller 42. The gap distance D in the first direction is also greater than a diameter of the supply roller 43.

Figure 5:
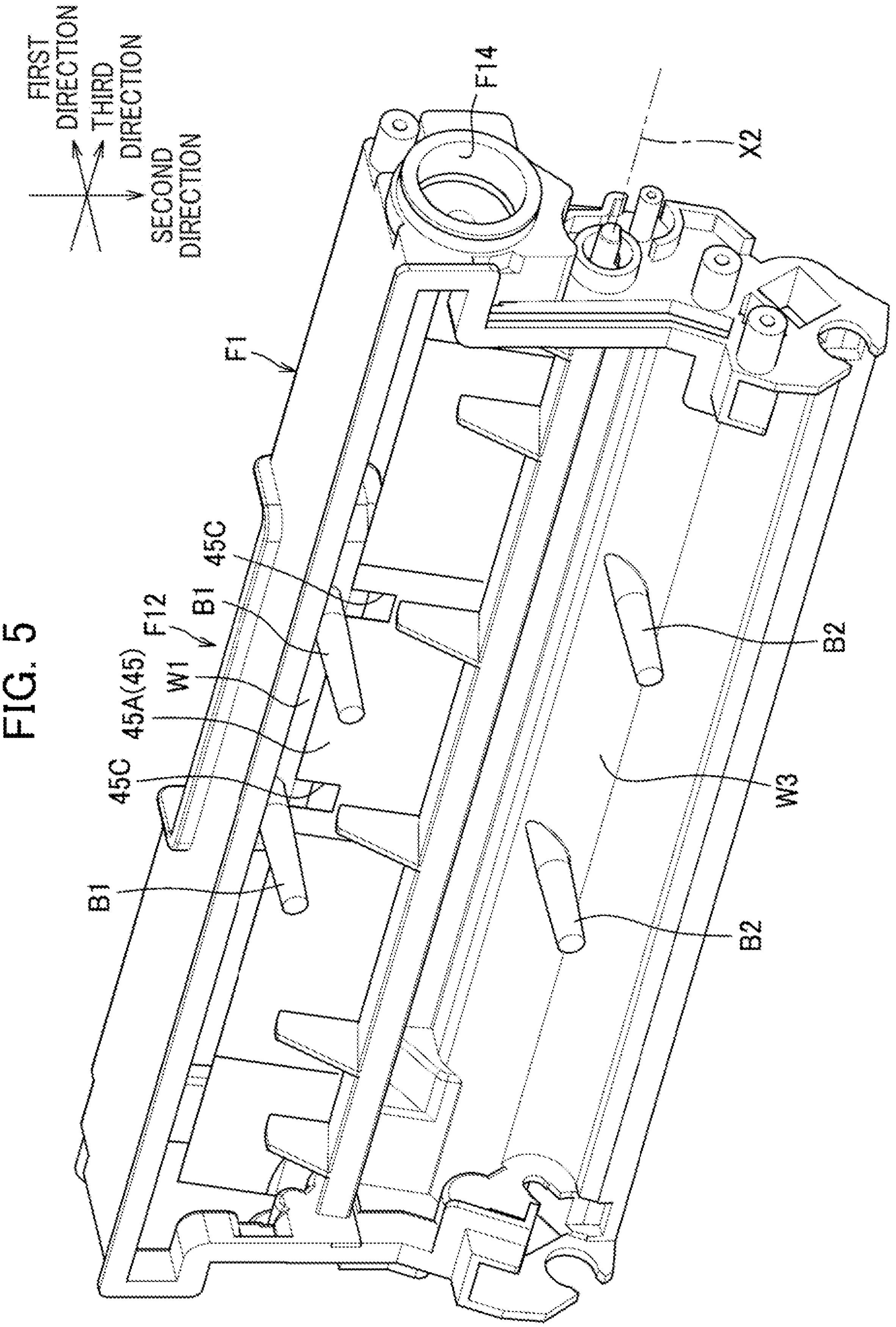
FIG. 5 is a perspective view illustrating a positional relationship between a first boss and an agitator in the developing cartridge.

The first bosses B1 extend in the first direction from the first wall W1 to the second frame F2, more specifically, to a second wall W2 (described later) of the second frame F2. Each first boss B1 extends from the first wall W1 toward the other side in the first direction, and is in contact with the second wall W2 of the second frame F2. The first bosses B1 are welded to the second wall W2. Specifically, as illustrated in FIG. 5, each first boss B1 is tapered to reduce its diameter toward the other side in the first direction as extending from the one side in the first direction.

The first bosses B1 are positioned inside the toner chamber 41A. The first bosses B1 are positioned on the other side in the second direction relative to the second axis X2.

The first frame F1 has the toner injection hole F14 for replenishing toner therethrough into the toner chamber 41A. As illustrated in FIG. 5, the toner injection hole F14 is formed in a side wall of the first frame F1 at the one side in the third direction. The first bosses B1 are positioned to overlap with the toner injection hole F14 when viewed in the third direction.

The third wall W3 is positioned at the one side in the second direction relative to the first wall W1. Specifically, the third wall W3 is positioned between the first axis X1 and the second axis X2 in the second direction.

The second bosses B2 extend in the first direction from the third wall W3 to the second frame F2, more specifically, to a fourth wall W4 (described later) of the second frame F2. Each second boss B2 extends from the third wall W3 toward the other side in the first direction, and is in contact with the fourth wall W4. The second bosses B2 are welded to the fourth wall W4.

The second frame F2 includes the second wall W2, the fourth wall W4, a sixth wall W6, and an anti-slip portion F21.

The second wall W2 faces the first wall W1 in the first direction. The second wall W2 has an inner surface facing the toner chamber 41A, and an outer surface W21 opposite the inner surface in the first direction.

The outer surface W21 is inclined with respect to the second direction such that the outer surface W21 extends toward the one side in the first direction as extending toward the other side in the second direction. In other words, the outer surface W21 is inclined relative to the second direction to approach the first wall W1 as extending away from the developing roller 42 in the second direction. The anti-slip portion F21 is configured of a plurality of protruding portions F22. The protruding portions F22 protrude, from the outer surface W21 of the second wall W2, in a direction away from the toner chamber 41A. With the plurality of protruding portions F22, the anti-slip portion F21 can function to suppress the user's fingers from slipping off the second frame F2 when the user holds the anti-slip portion F21. As illustrated in FIG. 4, the anti-slip portion F21 is positioned to overlap with the recessed portion F12 when viewed in the first direction.

The fourth wall W4 faces the third wall W3 in the first direction. The holder 44B of the thickness-regulating blade 44 is fixed to the fourth wall W4.

The sixth wall W6 extends toward the first frame F1 from an end of the second wall W2 at the other side in the second direction. The sixth wall W6 is in contact with the first frame F1.

As illustrated in FIG. 5, the first frame F1 includes two of the above-described first bosses B1 and two of the above-described second bosses B2, respectively. The two first bosses B1 are aligned with each other in the third direction with a space therebetween. The two second bosses B2 are aligned with each other in the third direction with a space therebetween.

Figure 6:
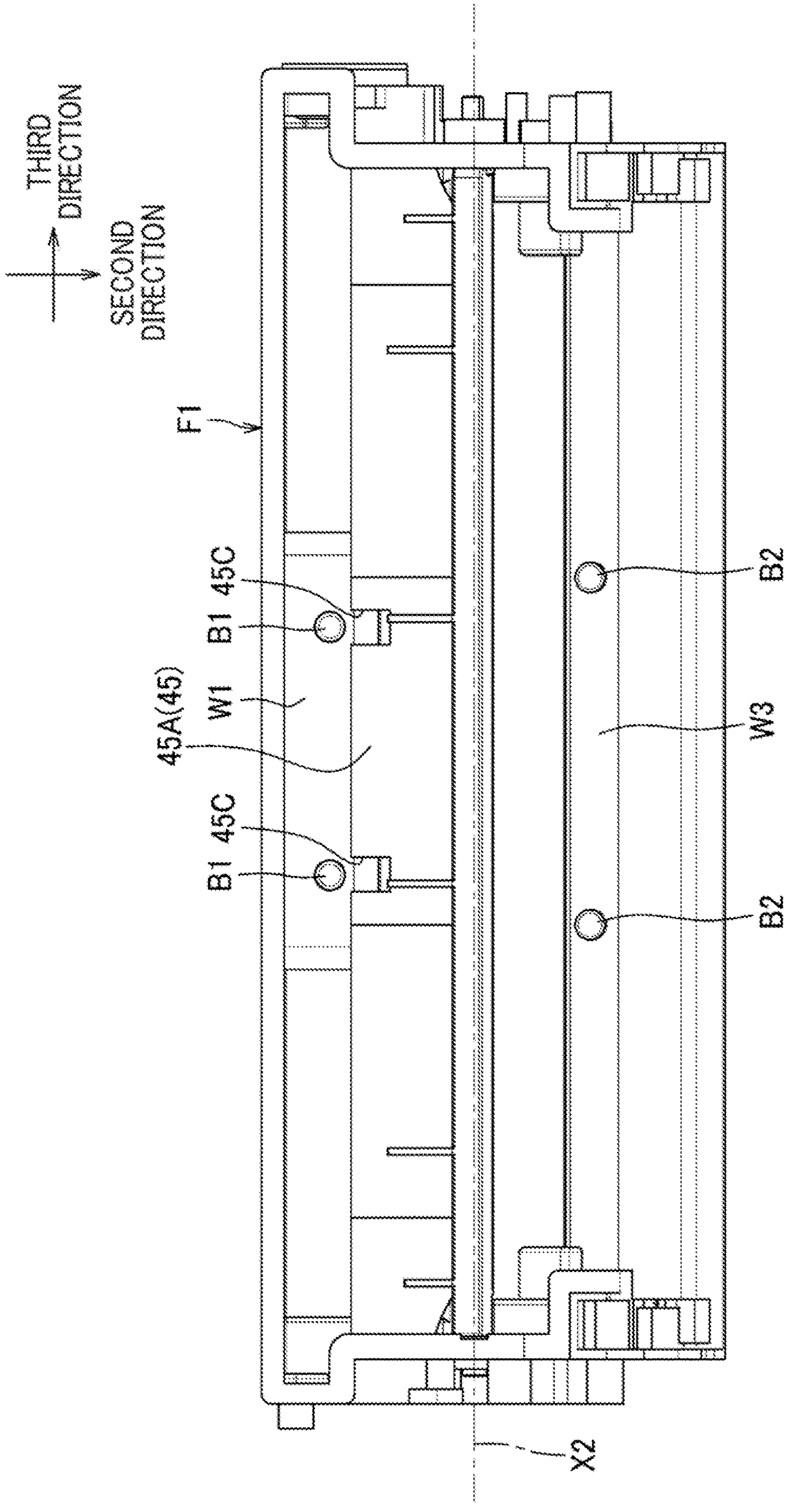
FIG. 6 is a plan view illustrating a positional relationship between the first boss and a film of the agitator in the developing cartridge.

As illustrated in FIG. 6, the two first bosses B1 are positioned between the two second bosses B2 in the third direction. As illustrated in FIGS. 5 and 6, the film 45A of the agitator 45 has two recesses 45C at positions corresponding to the two first bosses B1 in the third direction. That is, the two recesses 45C are provided one for each one of the two first bosses B1. Each recess has such a size that the first boss B1 can pass through the recess 45C when the agitator 45 rotates.

As illustrated in FIG. 1, the four developing cartridges 40 are aligned with one another in the first direction in a state where the four developing cartridges 40 are attached to the drawer 30. The four developing cartridges 40 are aligned in an order of the developing cartridges 40Y, 40C, and 40K from the one side toward the other side in the first direction.

In the state where the four developing cartridges 40 are attached to the drawer 30, the recessed portion F12 of the developing cartridge 40K faces the second wall W2 of the developing cartridge 40C in the first direction. In this case, the developing cartridge 40K corresponds to a first developing cartridge of the disclosure, and the developing cartridge 40C corresponds to a second developing cartridge of the disclosure.

Also, in the state where the four developing cartridges 40 are attached to the drawer the recessed portion F12 of the developing cartridge 40C faces the second wall W2 of the developing cartridge 40M in the first direction. In a case where the developing cartridge 40C is assumed to be the first developing cartridge of the disclosure, the developing cartridge 40M corresponds to the second developing cartridge of the disclosure. Still further, the recessed portion F12 of the developing cartridge 40M faces the second wall W2 of the developing cartridge 40Y in the first direction. In a case where the developing cartridge 40M is assumed to be the first developing cartridge of the disclosure, the developing cartridge 40Y corresponds to the second developing cartridge.

According to the configuration of the present embodiment, following technical advantages can be attained.

The recessed portion F12 is provided at the casing 41 having the toner chamber 41A. With this configuration, the casing 41 can be enlarged in size in the second direction to increase a toner capacity, compared to a conventional developing cartridge whose housing is provided with a handle protruding therefrom in the second direction. Further, since a user can insert his fingers in the recessed portion F12 to hold the casing 41 with a larger toner capacity, the user can easily exchange the developing cartridge 40. Further, even if the user grabs the first wall W1 and the second wall W2 with a greater force to hold the casing 41, the first bosses B1 extending from the first wall W1 to the second wall W2 can suppress deformation of the casing 41, thereby restraining leakage of the toner stored in the casing 41 due to deformation of the casing 41.

The film 45A of the agitator 45 has the recesses 45C at positions corresponding to the respective first bosses B1 in the third direction. This configuration can restrain deformation of the film 45A attributed to the contact of the film 45A against the two first bosses B1 while the agitator 45 is rotating.

The casing 41 further has the second bosses B2. The first bosses B1 and the second bosses B2 can serve to further restrain deformation of the casing 41.

The protrusion F13 is further provided on the first wall W1 of the recessed portion F12. This configuration can facilitate detachment of the developing cartridge 40 since a user can hook his fingers on the protrusion F13.

The anti-slip portion F21 is positioned to overlap with the recessed portion F12 when viewed in the first direction. With this configuration, when a user inserts his fingers in the recessed portion F12 to hold the casing 41, user's fingers may touch the anti-slip portion F21 but the anti-slip portion F21 can restrain slippage of his fingers. Detachment of the developing cartridge 40 can be further facilitated.

The outer surface W21 of the second wall W2 is inclined. This configuration can provide a space for insertion of user's fingers between the outer surface W21 and an external member disposed on the other side of the developing cartridge 40 in the first direction. Accordingly, this configuration can facilitate detachment of the developing cartridge 40. The provision of the inclined outer surface W21 enables the user to visually recognize the anti-slip portion F21 with ease.

The recessed portion F12 of the first developing cartridge (for example, the developing cartridge 40K) faces the second wall W2 of the second developing cartridge (for example, the developing cartridge 40C) in the first direction. The recessed portion F12 of the first developing cartridge can restrain user's fingers from interfering with the first developing cartridge at the time of detachment of the second developing cartridge.

<Modifications and Variations>

Figure 7:
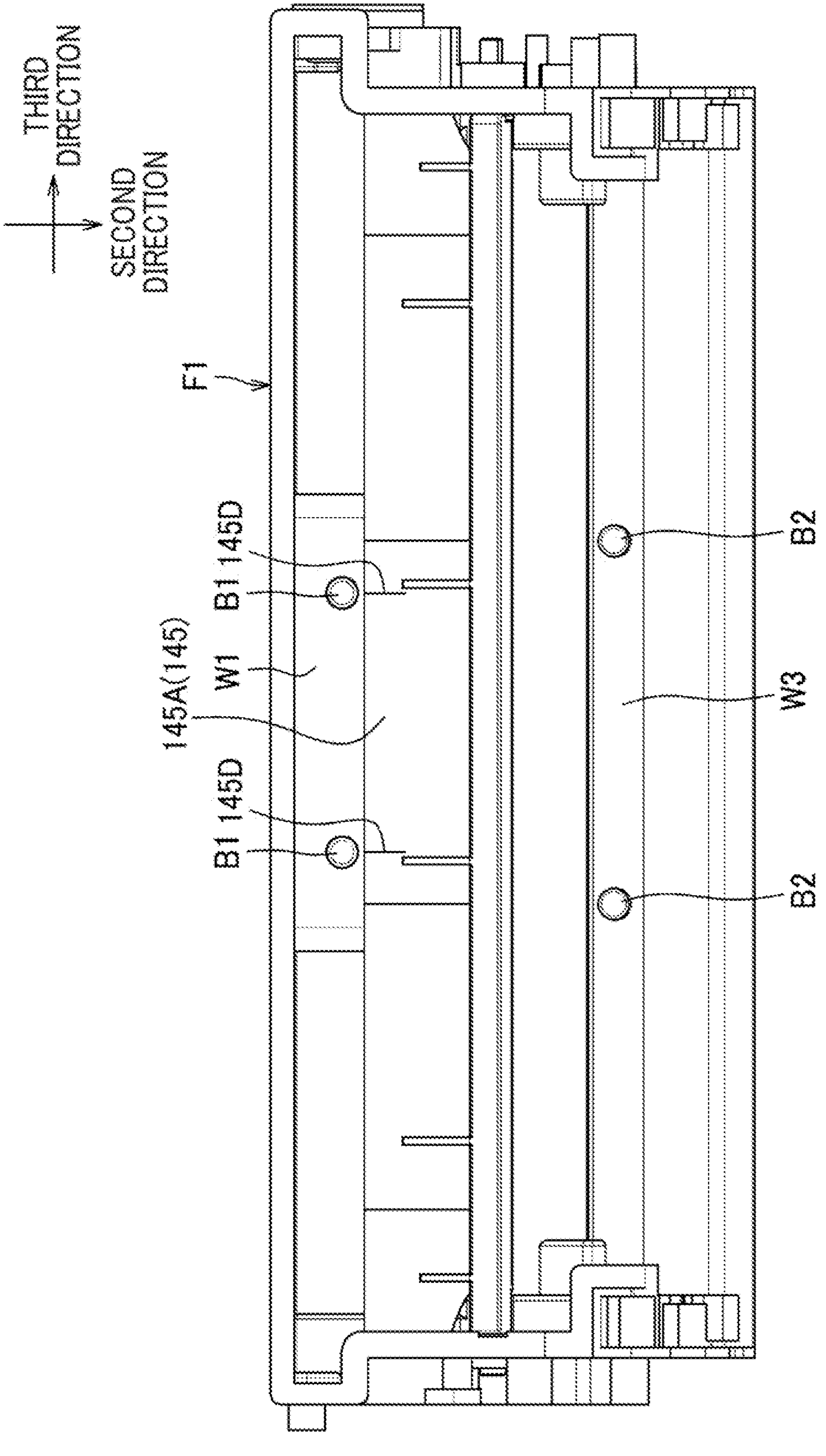
FIG. 7 is a plan view illustrating a positional relationship between the first boss and a film of an agitator according to a modification to the embodiment.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

As an example, FIG. 7 illustrates an agitator 145 according to a modification to the embodiment. The agitator 145 includes a film 145A formed with a pair of slits 45D, instead of the recesses 45C. In this modification, portions of the film 145A adjacent to the slits 145D contact the first bosses B1 during rotation of the agitator 145. However, the portions formed with the slits 145D can elastically deform upon contact with the first bosses B1, thereby suppressing deformation of the entire film 145A.

The first bosses B1 may extend from the second wall W2 to contact the first wall W1. Alternatively, each first boss B1 may be configured of: a first protruding portion protruding from the first wall W1; and a second protruding portion protruding from the second wall W2 to contact the first protruding portion. Still further, the first bosses B1 need not be welded. The number of the first boss B1 need not be two, but may be one or not less than three.

The second bosses B2 may extend from the fourth wall W4 to contact the third wall W3. Alternatively, the second boss B2 may be configured of: a third protruding portion protruding from the third wall W3; and a fourth protruding portion protruding from the fourth wall W4 to contact the third protruding portion. Further, the second bosses B2 need not be welded. The number of the second bosses B2 need not be two, but may be one or not less than three.

The protrusion F13 of the recessed portion F12 for receiving user's fingers may be arranged at a position apart from the end of the first wall W1 at the other side in the second direction.

The recessed portion F12 may open only toward the other side in the second direction, but may not open toward the one side in the first direction.

The gap distance D in the first direction between the recessed portion F12 and the second frame F2 may be shorter than the length (thickness) in the first direction of the first wall W1.

The anti-slip portion F21 of the embodiment includes the plurality of the protrusions F22. However, the anti-slip portion F21 may be a smooth flat surface without protrusions. In this case, a part of the outer surface W21 of the second wall W2 may be covered with a material having a high friction coefficient, or a seal or a film made of a material having a high friction coefficient in order to make the anti-slip portion F21 function as a stopper.

In the recessed portion F12, only a portion of the first surface W11 may be exposed to the outside of the casing 41 in a direction orthogonal to the first surface W11. Likewise, only a portion of the second surface W51 may be exposed to the outside of the casing 41 in a direction orthogonal to the second surface W51.

The image forming apparatus 1 need not include the drawer 30, and the developing cartridges 40 may be attachable directly to the main body 10.

The first direction may be the left-right direction or the up-down direction with respect to the main housing 10. The second direction may be any direction different from the direction in the described embodiment, provided that the second direction is orthogonal to the first direction. Likewise, the third direction may be any direction different from the direction in the described embodiment, provided that the third direction is orthogonal to the first direction and the second direction.

Further, the one side in the first direction need not be toward downstream side in a pulled-out direction of the drawer toward the second position (the direction in which the drawer 30 is withdrawn from the main housing 10). Rather, the one side in the first direction may be toward an upstream side in the pulled-out direction of the drawer.

The image forming apparatus of the disclosure need not be a printer, but may be a copying machine or a multifunction device.

The elements described in connection with the embodiment and modifications thereto may be combined as appropriate.

[Remarks]

The developing cartridge 40 is an example of a developing cartridge of the disclosure. The casing 41 is an example of a casing of the developing cartridge. The toner chamber 41A is an example of a toner chamber. The developing roller 42 is an example of a developing roller of the developing cartridge. The recessed portion F12 is an example of a recessed portion of the casing. The first wall W1 is an example of a first wall of the casing. The second wall W2 is an example of a second wall of the casing. The first boss B1 is an example of a first boss of the casing. The first frame F1 is an example of a first frame of the casing. The second frame F2 is an example of a second frame of the casing. The second boss B2 is an example of a second boss of the casing. The third wall W3 is an example of a third wall of the casing. The fourth wall W4 is an example of a fourth wall of the casing. The fifth wall W5 is an example of a fifth wall of the casing. The sixth wall W6 is an example of a sixth wall of the casing. The protrusion F13 is an example of a protrusion of the casing. The anti-slip portion F21 is an example of an anti-slip portion of the casing. The protrusions F22 are examples of a protrusions of the anti-slip portion. The outer surface W21 is an example of an outer surface of the second wall of the casing. The toner injection hole F14 is an example of a toner injection hole of the casing. The agitators 45, 145 are examples of an agitator of the developing cartridge. The films 45A, 145A are examples of a film of the agitator. The recess 45C is an example of a recess of the film of the agitator. The slit 145D is an example of a slit of the film of the agitator. The flat surface F11 is an example of a flat surface of the casing. The first surface W11 and second surface W51 are examples of a first surface and a second surface of the casing. The drawer 30 is an example of a drawer of an image forming apparatus of the disclosure. The main housing 10 is an example of a main housing of the image forming apparatus.

What is claimed is:

1. A developing cartridge attachable to a drawer of an image forming apparatus, the drawer being movable in a first direction relative to a main housing of the image forming apparatus, the developing cartridge comprising:

a casing having a toner chamber configured to accommodate toner therein, the casing having one end portion and another end portion spaced apart from each other in a second direction, the one end portion of the casing being at one side in the second direction and the another end portion of the casing being at another side in the second direction; and a developing roller positioned at the one end portion of the casing in the second direction, the developing roller being rotatable about a first axis extending in a third direction, wherein the casing comprises:

a recessed portion recessed from an outer surface of the casing toward the developing roller, the recessed portion being positioned at a center in the third direction of the another end portion of the casing in the second direction;

a first wall extending in the second direction and forming a part of the recessed portion;

a second wall facing the first wall in the first direction, the second wall defining a part of the toner chamber; and a boss positioned inside the toner chamber, the boss extending from the first wall to be connected to the second wall.

2. The developing cartridge according to claim 1, wherein the casing comprises:

a first frame including the recessed portion and the first wall, the first frame being positioned at one side in the first direction relative to the toner chamber, and a second frame including the second wall, the second frame being positioned at another side in the first direction relative to the first frame, the second frame defining the toner chamber in cooperation with the first frame.

3. The developing cartridge according to claim 2, wherein the first frame and the second frame are positioned opposite each other with respect to the toner chamber in the first direction.

4. The developing cartridge according to claim 2, wherein the second frame includes a contact wall extending toward the first frame from an end portion of the second wall at the another side in the second direction, the contact wall being in contact with the first frame.

5. The developing cartridge according to claim 2, wherein the recessed portion is spaced away from the second frame in the first direction, the recessed portion enabling user's fingers to be inserted from the another side in the second direction and from the one side in the first direction relative to the recessed portion, and wherein the recessed portion and the second frame define a gap distance therebetween in the first direction that is greater than a length in the first direction of the first wall.

6. The developing cartridge according to claim 1, wherein the boss extends from the first wall to contact the second wall.

7. The developing cartridge according to claim 6, wherein the boss is welded to the second wall.

8. The developing cartridge according to claim 1, wherein the casing comprises a plurality of the bosses.

9. The developing cartridge according to claim 8, wherein the plurality of the first bosses is aligned with one another in the third direction.

10. The developing cartridge according to claim 1, further comprising an agitator rotatable about a second axis extending in the third direction, wherein the first-boss is positioned at the another side in the second direction relative to the second axis.

11. The developing cartridge according to claim 10, wherein the agitator comprises a film configured to contact an inner surface of the casing, and wherein the film has one of a recess and a slit at a position corresponding to the boss in the third direction.

12. The developing cartridge according to claim 1, wherein the casing has a toner injection hole for replenishing toner therethrough into the toner chamber, and wherein the boss is positioned to overlap with the toner injection hole when viewed in the third direction.

13. The developing cartridge according to claim 1, wherein the casing further comprises:

a third wall positioned at the one side in the second direction relative to the first wall;

a fourth wall facing the third wall in the first direction; and a second boss extending from the third wall to be connected to the fourth wall.

14. The developing cartridge according to claim 13, wherein the casing includes a plurality of the first-bosses, wherein the casing further includes two of the second bosses aligned with each other in the third direction, and wherein the plurality of the first-bosses is positioned between the two second bosses in the third direction.

15. The developing cartridge according to claim 1, wherein the first wall has one end portion and another end portion spaced apart from each other in the second direction, the one end portion of the first wall being at the one side in the second direction and the another end portion of the first wall being at the another side in the second direction, and wherein the casing further comprises:

a connecting wall forming another part of the recessed portion, the connecting wall extending from the one end portion of the first wall in the second direction toward one side in the first direction; and a protrusion protruding from the another end portion of the first wall in the second direction toward the one side in the first direction.

16. The developing cartridge according to claim 15, wherein the connecting wall extends from the one end portion of the first wall in the second direction to extend away from the toner chamber in the first direction, and wherein the protrusion protrudes from the another end portion of the first wall in the second direction to extend away from the toner chamber in the first direction.

17. The developing cartridge according to claim 1, wherein the casing further comprises an anti-slip portion configured of a plurality of protrusions protruding from the second wall in a direction away from the toner chamber, and wherein the anti-slip portion is positioned to overlap with the recessed portion when viewed in the first direction.

18. The developing cartridge according to claim 1, wherein the second wall has an inner surface facing the toner chamber and an outer surface opposite the inner surface in the first direction, and wherein the outer surface of the second wall is inclined to extend toward one side in the first direction as extending toward the another side in the second direction.

19. The developing cartridge according to claim 1, wherein the recessed portion is positioned to overlap with the toner chamber when viewed in the first direction.

20. The developing cartridge according to claim 1, wherein the casing has one end portion and another end portion spaced apart from each other in the third direction, the one end portion of the casing being at one side in the third direction and the another end portion of the casing being at another side in the third direction, wherein the casing has a flat surface positioned at the another end portion of the casing in the second direction, the flat surface extending to span between the one end portion of the casing in the third direction and the another end portion of the casing in the third direction, and wherein the recessed portion is recessed from the flat surface.

21. The developing cartridge according to claim 1, wherein the casing has:

a first surface extending in the second direction; and a second surface positioned at the one side in the second direction relative to the first surface and extending in the first direction, the first surface and the second surface forming the recessed portion, wherein the first surface is exposed to an outside of the casing in a direction orthogonal to the first surface, and wherein the second surface is exposed to the outside of the casing in a direction orthogonal to the second surface.

22. The developing cartridge according to claim 1, wherein the second direction is orthogonal to the first direction, and wherein the third direction is orthogonal to the first direction and the second direction.

23. An image forming apparatus comprising:

a main housing;

the developing cartridge according to claim 1; and a drawer to which the developing cartridge is attachable, the drawer being movable in the first direction between a first position at which the drawer is positioned inside the main housing and a second position at which the drawer is positioned outside the main housing.

24. The image forming apparatus according to claim 23, wherein a plurality of the developing cartridges is attachable to the drawer, the plurality of the developing cartridges comprising a first developing cartridge and a second developing cartridge, the second developing cartridge being positioned at one side in the first direction relative to the first developing cartridge when the first developing cartridge and the second developing cartridge are attached to the drawer, and wherein the recessed portion of the first developing cartridge faces the second wall of the second developing cartridge in the first direction when the first developing cartridge and the second developing cartridge are attached to the drawer.

* * * * *